(12) United States Patent
Tan

(10) Patent No.: US 12,504,158 B1
(45) Date of Patent: Dec. 23, 2025

(54) CONVENIENT-TO-MOUNT EMERGENCY POWER SUPPLY FOR UFO HIGHBAY LIGHT

(71) Applicant: Dongguan Haiyue Intelligent Technology Co., Ltd, Dongguan (CN)

(72) Inventor: Huishi Tan, Shenzhen (CN)

(73) Assignee: Dongguan Haiyue Intelligent Technology Co., Ltd, Dongguan (CN)

( * ) Notice: Subject to any disclaimer, the term of this patent is extended or adjusted under 35 U.S.C. 154(b) by 0 days.

(21) Appl. No.: 18/924,253

(22) Filed: Oct. 23, 2024

(30) Foreign Application Priority Data

Aug. 22, 2024 (CN) .......................... 202422050901.3

(51) Int. Cl.
| | | |
|---|---|---|
| *F21V 23/02* | (2006.01) | |
| *F21S 8/04* | (2006.01) | |
| *F21S 9/02* | (2006.01) | |
| *F21V 23/04* | (2006.01) | |
| *F21V 31/00* | (2006.01) | |

(52) U.S. Cl.
CPC .............. *F21V 23/023* (2013.01); *F21S 8/04* (2013.01); *F21S 9/022* (2013.01); *F21V 23/0435* (2013.01); *F21V 31/005* (2013.01)

(58) Field of Classification Search
CPC .. F21V 23/023; F21V 23/0435; F21V 31/005; F21S 8/04; F21S 9/022
See application file for complete search history.

(56) References Cited

U.S. PATENT DOCUMENTS

| | | | | |
|---|---|---|---|---|
| 9,618,678 | B1* | 4/2017 | Tickner | .................... G02B 6/00 |
| 10,302,283 | B2* | 5/2019 | Moon | ..................... F21V 21/03 |
| 2014/0355302 | A1* | 12/2014 | Wilcox | ............... F21V 23/0464 |
| | | | | 362/609 |
| 2020/0363051 | A1* | 11/2020 | Ma | .......................... F21V 29/10 |

FOREIGN PATENT DOCUMENTS

| | | |
|---|---|---|
| CN | 115800494 A | 3/2023 |
| CN | 117054921 A | 11/2023 |
| CN | 117277541 A | 12/2023 |

* cited by examiner

*Primary Examiner* — Tsion Tumebo
(74) *Attorney, Agent, or Firm* — Nitin Kaushik

(57) ABSTRACT

Disclosed in the present utility model is a convenient-to-mount emergency power supply for a UFO highbay light, including a power supply housing that is in a cylindrical structure and is further provided with a first accommodating cavity with an opening in a bottom, where four first spacer plates mutually connected end to end are further mounted in a middle of the first accommodating cavity and define a first mounting cavity for mounting a main control printed circuit board (PCB); a joint between every two adjacent first spacer plates is further connected to a first fixing column, and a top of the first fixing column is further provided with a first locking hole that penetrates to a bottom thereof, and a battery connected to the main control PCB is further mounted in the first accommodating cavity.

8 Claims, 4 Drawing Sheets

CONVENIENT-TO-MOUNT EMERGENCY POWER SUPPLY FOR UFO HIGHBAY LIGHT

CROSS-REFERENCE TO RELATED APPLICATIONS

The application claims priority to Chinese patent application No. 2024220509013, filed on Aug. 22, 2024, the entire contents of which are incorporated herein by reference.

TECHNICAL FIELD

The present utility model relates to the technical field of UFO highbay lights, in particular to a convenient-to-mount emergency power supply for a UFO highbay light.

BACKGROUND

At present, the common power supply for a UFO highbay light is a common driving power supply on the market, which is mounted on the light through mounting holes in the power supply. However, the current power supply for the UFO highbay light only has unilateral input and output to achieve the function of turning on or off the light, without emergency, remote control and other functions, resulting in relatively single function and poor usage experience of users. Therefore, the power supply needs to be improved.

SUMMARY

An objective of the present utility model is to provide a convenient-to-mount emergency power supply for a UFO highbay light. The emergency power supply integrates a Bluetooth antenna and an infrared receiver, which can implement a remote intelligent control function of a terminal and meet usage requirements of different users, thereby improving usage experience of the users. Moreover, a dip switch is further provided, which can implement functions of adjusting power, adjusting a color temperature, and the like, so as to adapt to different usage environments. In addition, the emergency power supply is reasonable in overall design, compact in structure, convenient to use, and highly practical.

To achieve the above objective, the following technical solution is adopted:

A convenient-to-mount emergency power supply for a UFO highbay light, including:

a power supply housing that is in a cylindrical structure and is further provided with a first accommodating cavity with an opening in a bottom, where four first spacer plates mutually connected end to end are further mounted in a middle of the first accommodating cavity and define a first mounting cavity for mounting a main control printed circuit board (PCB); a joint between every two adjacent first spacer plates is further connected to a first fixing column, and a top of the first fixing column is further provided with a first locking hole that penetrates to a bottom thereof; and a battery connected to the main control PCB is further mounted in the first accommodating cavity, and an outer wall of the power supply housing is further mounted with a Bluetooth antenna connected to the main control PCB; and a power supply cover plate that is connected to the opening in the bottom of the power supply housing and seals the first accommodating cavity, where a part of a bottom of the power supply cover plate corresponding to the first locking hole is provided with a first through hole, and a part of a top of the power supply housing corresponding to the first locking hole is further provided with a second through hole.

Further, an outer wall of the first fixing column is further connected to a second fixing column, and a bottom of the second fixing column is provided with a second locking hole; a bottom of the first fixing column is further connected to a first waterproof gasket, and an outer wall of the first waterproof gasket is further provided with a first extension portion in a manner of extending outwards; and the first extension portion is arranged at the bottom of the second fixing column, and a part of the first extension portion corresponding to the second locking hole is further provided with a third through hole.

Further, outer walls of two adjacent first fixing columns are each further connected to a second spacer plate; and a second mounting cavity is defined between the two second spacer plates, and a Bluetooth PCB connected to the Bluetooth antenna and the main control PCB is further mounted in the second mounting cavity.

Further, an inner wall of the first accommodating cavity is further connected to two third spacer plates arranged at an interval, and a first connecting plate is further connected between one ends of the two third spacer plates; a third mounting cavity is defined between the two third spacer plates and the first connecting plate, and a switch PCB connected to the main control PCB is further mounted in the third mounting cavity; the switch PCB is further mounted with a dip switch; and a part of the outer wall of the power supply housing corresponding to the dip switch is further provided with a debugging hole, and a dust cover is further mounted in the debugging hole.

Further, one opposite sides of the two third spacer plates are each connected to a limiting clamping block, and one side of each limiting clamping block is provided with a limiting clamping groove along a vertical direction; and two ends of the switch PCB are each clamped in the limiting clamping groove.

Further, the outer wall of the power supply housing is further mounted with an infrared receiver and an indicator light button that are connected to the main control PCB.

Further, the opening in the bottom of the first accommodating cavity is further connected to a second waterproof gasket.

Further, a fixing table is disposed in a middle of the top of the power supply housing in a manner of extending upwards and is further provided with a first fixing hole, and the power supply cover plate is further provided with a wire hole.

With the above solution, the present utility model has the following beneficial effects:

The present utility model integrates the Bluetooth antenna and the infrared receiver, which can implement a remote intelligent control function of a terminal and meet usage requirements of different users, thereby improving usage experience of the users. Moreover, the dip switch is further provided, which can implement functions of adjusting power, adjusting a color temperature, and the like, so as to adapt to different usage environments. In addition, the emergency power supply is reasonable in overall design, compact in structure, convenient to use, and highly practical.

DESCRIPTION OF REFERENCE SIGNS 1. power supply housing; 2. power supply cover plate; 3. second spacer plate; 4. Bluetooth PCB; 5. switch PCB; 6. dust cover; 7. infrared receiver; 8. indicator light button; 9. second waterproof gasket; 11. first spacer plate; 12. first fixing column; 13. main control PCB; 14. battery; 15. Bluetooth antenna; 16. second fixing column; 17. first waterproof gasket; 18. first extension portion; 19. fixing table; 10. second through hole; 51. dip switch; 101. third spacer plate; 102. first connecting plate; and 103. limiting clamping block.

DETAILED DESCRIPTION OF THE EMBODIMENTS

The present utility model is described in detail below in conjunction with the accompanying drawings and specific embodiments.

Figure 1:
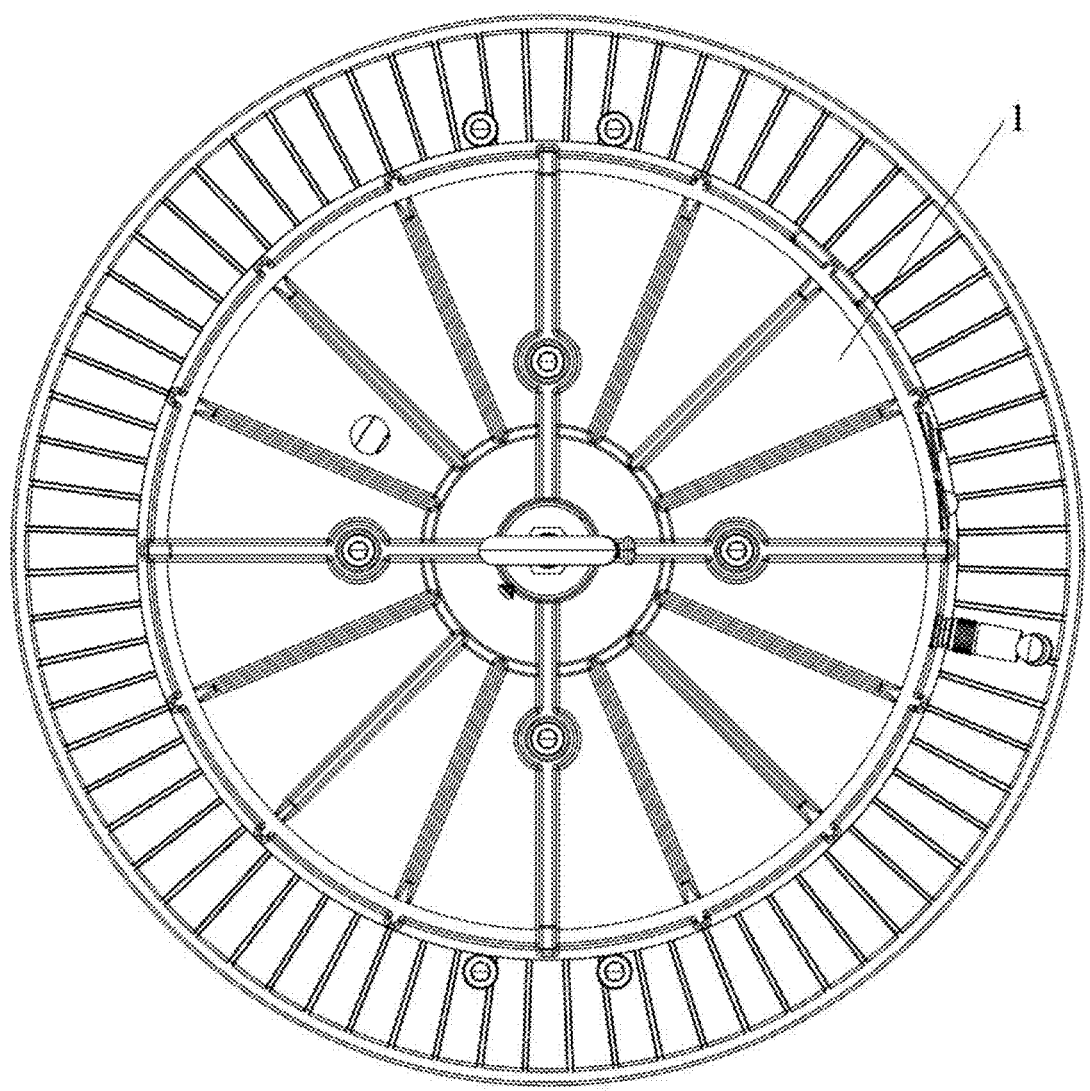
FIG. 1 is a schematic structural diagram of the present utility model mounted on a UFO highbay light in an embodiment.
Figure 2:
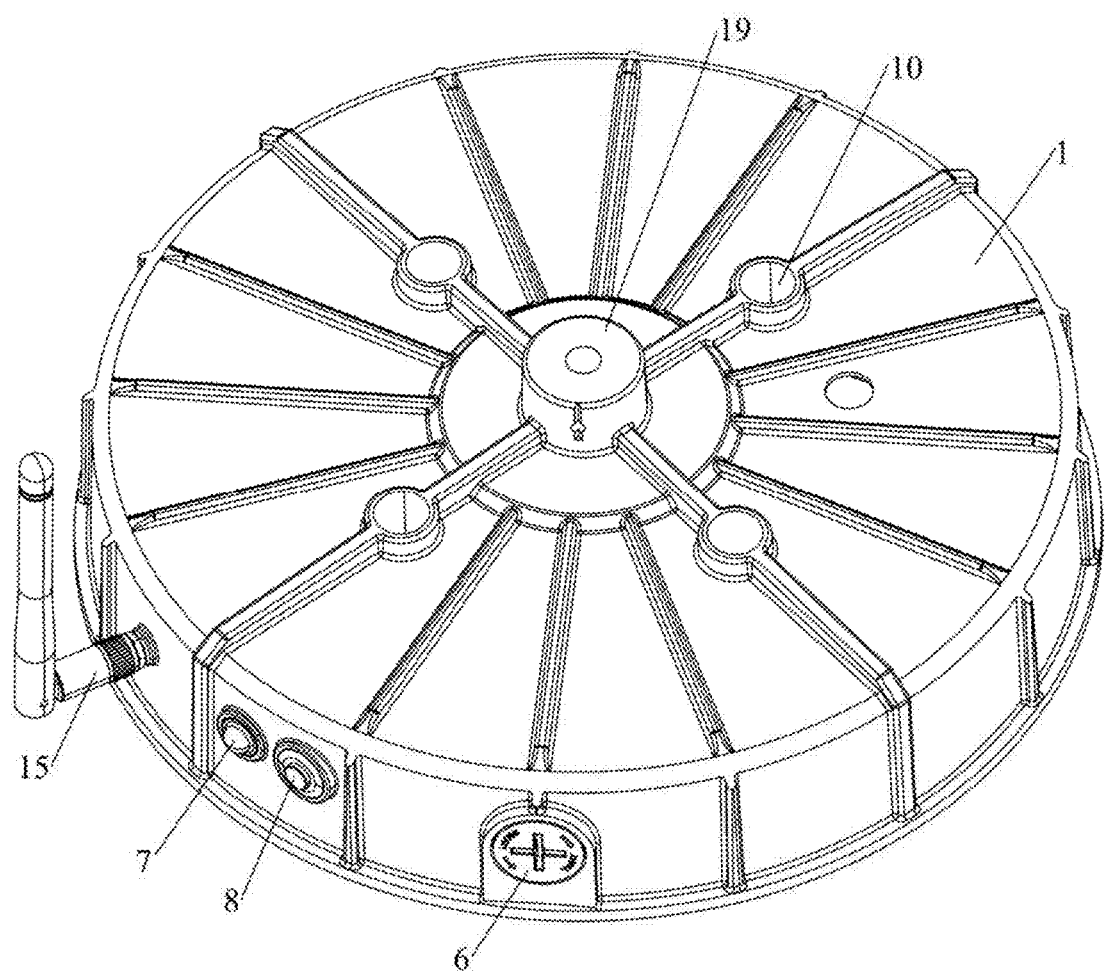
FIG. 2 is a schematic structural diagram of the present utility model.
Figure 3:
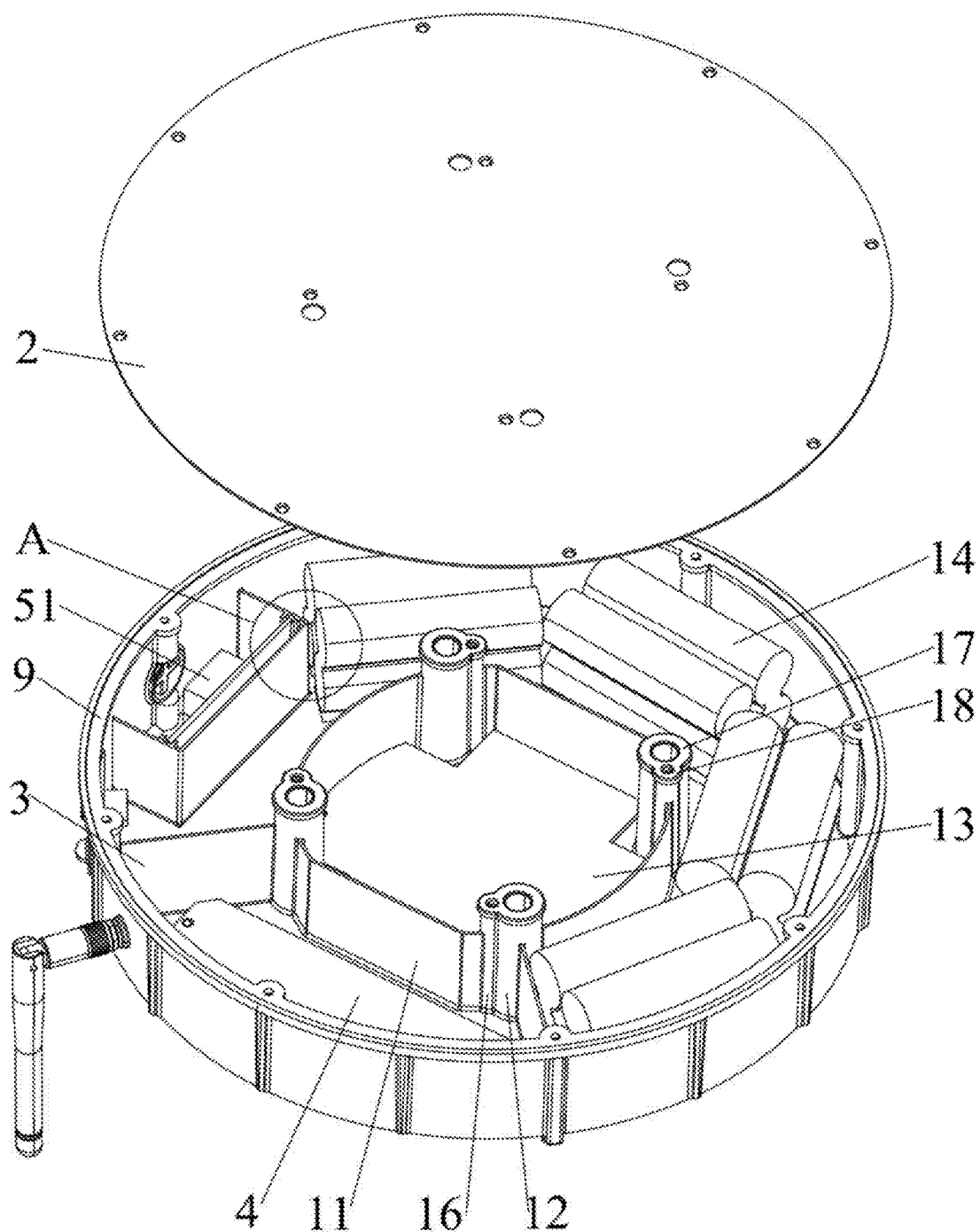
FIG. 3 is an exploded view of the present utility model.
Figure 4:
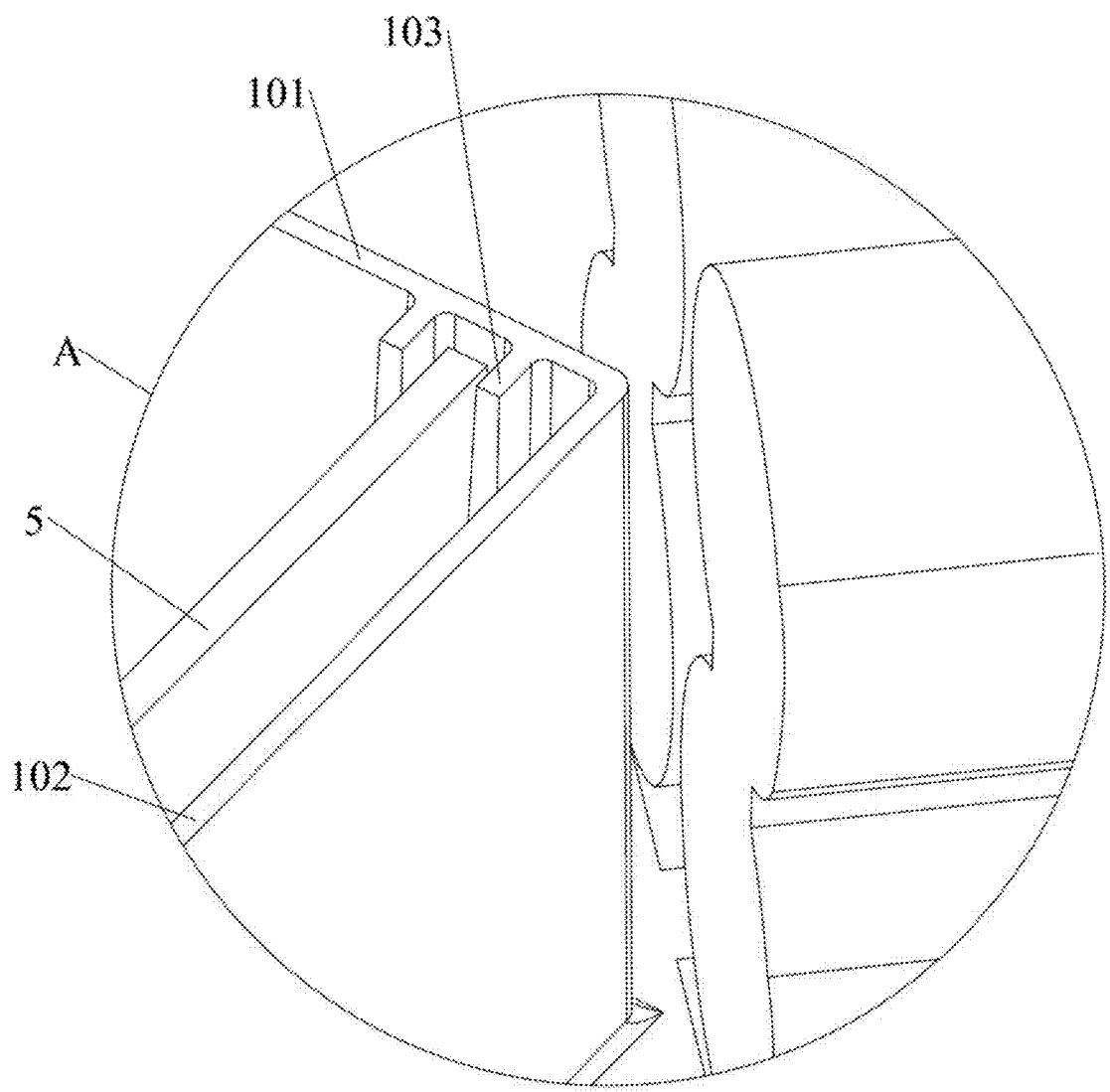
FIG. 4 is a schematic partial enlarged view of a part A in FIG. 3.

Referring to FIGS. 1 to 4, the present utility model provides a convenient-to-mount emergency power supply for a UFO highbay light, in an embodiment, including:

a power supply housing 1, where the power supply housing 1 is in a cylindrical structure, and the power supply housing 1 is further provided with a first accommodating cavity with an opening in a bottom; four first spacer plates 11 mutually connected end to end are further mounted in a middle of the first accommodating cavity, and the four first spacer plates 11 define a first mounting cavity for mounting a main control PCB 13; a joint between every two adjacent first spacer plates 11 is further connected to a first fixing column 12, and a top of the first fixing column 12 is further provided with a first locking hole that penetrates to a bottom thereof; and a battery 14 connected to the main control PCB 13 is further mounted in the first accommodating cavity, and an outer wall of the power supply housing 1 is further mounted with a Bluetooth antenna 15 connected to the main control PCB 13; and a power supply cover plate 2, where the power supply cover plate 2 is connected to the opening in the bottom of the power supply housing 1 and seals the first accommodating cavity;

a part of a bottom of the power supply cover plate 2 corresponding to the first locking hole is provided with a first through hole, and a part of a top of the power supply housing 1 corresponding to the first locking hole is further provided with a second through hole 10.

Continuously referring to FIGS. 1 to 4, during mounting of the power supply, the power supply can be directly arranged at a top of the existing UFO highbay light, so that the first through holes are aligned with screw holes reserved in the light. Then, screws are inserted into the second through holes 10, pass through the first locking holes of the first fixing columns 12 and the first through holes of the power supply cover plate 2 in sequence, and are locked in the screw holes to complete assembly. The power supply is convenient and fast to assemble, and convenient to disassemble and maintain in a later stage. In this embodiment, the power supply housing 1 is in the cylindrical structure that matches with the circular UFO highbay light. Moreover, the top of the power supply housing 1 is provided with a wiring hole for connection of a mains cable, and the main control PCB 13 is mounted in the first mounting cavity defined by the four first spacer plates 11, so that the main control PCB 13 can be isolated from other parts in the power supply, thereby preventing the electromagnetic interference and the damage to the main control PCB 13 due to a failure of the power supply, and improving the safety of the power supply in use. In addition, outer walls of two adjacent first fixing columns 12 are each further connected to a second spacer plate 3; a second mounting cavity is defined between the two second spacer plates 3, and a Bluetooth PCB 4 connected to the Bluetooth antenna 15 and the main control PCB 13 is further mounted in the second mounting cavity. The Bluetooth antenna 15 is provided, which can receive a Bluetooth signal and thus can be remotely controlled to work by a device supporting a Bluetooth function (e.g., a mobile phone), thereby improving the convenience in use of the product.

In an embodiment, an outer wall of the first fixing column 12 is further connected to a second fixing column 16, and a bottom of the second fixing column 16 is provided with a second locking hole; a bottom of the first fixing column 12 is further connected to a first waterproof gasket 17, and an outer wall of the first waterproof gasket 17 is further provided with a first extension portion 18 in a manner of extending outwards; and the first extension portion 18 is arranged at the bottom of the second fixing column 16, and a part of the first extension portion 18 corresponding to the second locking hole is further provided with a third through hole. A screw can be inserted into the third through hole and locked in the second locking hole to lock and fix the first waterproof gasket 17. The use of the first waterproof gaskets 17 can prevent water from entering the power supply to affect the service life thereof.

In an embodiment, an inner wall of the first accommodating cavity is further connected to two third spacer plates 101, the two third spacer plates 101 are arranged at an interval, and a first connecting plate 102 is further connected between one ends of the two third spacer plates 101; a third mounting cavity is defined between the two third spacer plates 101 and the first connecting plate 102, and a switch PCB 5 connected to the main control PCB 13 is further mounted in the third mounting cavity; the switch PCB 5 is further mounted with a dip switch 51; and a part of the outer wall of the power supply housing 1 corresponding to the dip switch 51 is further provided with a debugging hole, and a dust cover 6 is further mounted in the debugging hole. The dip switch 51 is provided, which can implement functions of adjusting power, adjusting a color temperature, and the like, so as to adapt to different usage environments. Meanwhile, the dust cover 6 is further provided. When the dip switch 51 is not in use, the dust cover 6 can prevent dust from entering the power supply. Moreover, one opposite sides of the two third spacer plates 101 are each connected to a limiting clamping block 103, and one side of each limiting clamping block 103 is provided with a limiting clamping groove along a vertical direction; and two ends of the switch PCB 5 are each clamped in the limiting clamping groove. The two ends of the PCB 5 are each clamped in the limiting clamping groove, which can improve the mounting stability thereof.

In an embodiment, the outer wall of the power supply housing 1 is further mounted with an infrared receiver 7 and an indicator light button 8 that are connected to the main control PCB 13. The infrared receiver 7 can receive an infrared signal and can be remotely controlled to work by a remote controller with an infrared function. Meanwhile, the indicator light button 8 is provided, which can display a working state of the power supply to the outside. Various control modes such as a Bluetooth control mode and an infrared control mode are provided and can be selected by a user according to usage requirements, thereby improving the universality of the product in use.

Moreover, to further improve the waterproof performance, the opening in the bottom of the first accommodating cavity is further connected to a second waterproof gasket 9. In addition, a fixing table 19 is disposed in a middle of the top of the power supply housing 1 in a manner of extending upwards, and the fixing table 19 is further provided with a first fixing hole; and the power supply cover plate 2 is further provided with a wire hole. The first fixing hole is configured to mount a hook, so as to lift the assembled light to the outside. Meanwhile, the power supply cover plate 2 is further provided with the wire hole, so that a cable of the power supply can be connected to a device such as a light board in the light through the wire hole.

The above are only preferred embodiments of the present utility model and are not used to limit the present utility model. Any modifications, equivalent substitutions and improvements, etc. made within the spirit and principle of the present utility model shall be included within the scope of protection of the present utility model.

What is claimed is:

1. A convenient-to-mount emergency power supply for a UFO highbay light, comprising:
   a power supply housing that is in a cylindrical structure and is further provided with a first accommodating cavity with an opening in a bottom, wherein four first spacer plates mutually connected end to end are further mounted in a middle of the first accommodating cavity and define a first mounting cavity for mounting a main control printed circuit board (PCB); a joint between every two adjacent first spacer plates is further connected to a first fixing column, and a top of the first fixing column is further provided with a first locking hole that penetrates to a bottom thereof; and a battery connected to the main control PCB is further mounted in the first accommodating cavity, and an outer wall of the power supply housing is further mounted with a Bluetooth antenna connected to the main control PCB; and
   a power supply cover plate that is connected to the opening in the bottom of the power supply housing and seals the first accommodating cavity, wherein a part of a bottom of the power supply cover plate corresponding to the first locking hole is provided with a first through hole, and a part of a top of the power supply housing corresponding to the first locking hole is further provided with a second through hole.

2. The convenient-to-mount emergency power supply for a UFO highbay light according to claim 1, wherein an outer wall of the first fixing column is further connected to a second fixing column, and a bottom of the second fixing column is provided with a second locking hole; a bottom of the first fixing column is further connected to a first waterproof gasket, and an outer wall of the first waterproof gasket is further provided with a first extension portion in a manner of extending outwards; and the first extension portion is arranged at the bottom of the second fixing column, and a part of the first extension portion corresponding to the second locking hole is further provided with a third through hole.

3. The convenient-to-mount emergency power supply for a UFO highbay light according to claim 1, wherein outer walls of two adjacent first fixing columns are each further connected to a second spacer plate; and a second mounting cavity is defined between the two second spacer plates, and a Bluetooth PCB connected to the Bluetooth antenna and the main control PCB is further mounted in the second mounting cavity.

4. The convenient-to-mount emergency power supply for a UFO highbay light according to claim 1, wherein an inner wall of the first accommodating cavity is further connected to two third spacer plates arranged at an interval, and a first connecting plate is further connected between one ends of the two third spacer plates; a third mounting cavity is defined between the two third spacer plates and the first connecting plate, and a switch PCB connected to the main control PCB is further mounted in the third mounting cavity; the switch PCB is further mounted with a dip switch; and a part of the outer wall of the power supply housing corresponding to the dip switch is further provided with a debugging hole, and a dust cover is further mounted in the debugging hole.

5. The emergency power supply for a UFO highbay light according to claim 4, wherein one opposite sides of the two third spacer plates are each connected to a limiting clamping block, and one side of each limiting clamping block is provided with a limiting clamping groove along a vertical direction; and two ends of the switch PCB are each clamped in the limiting clamping groove.

6. The emergency power supply for a UFO highbay light according to claim 1, wherein the outer wall of the power supply housing is further mounted with an infrared receiver and an indicator light button that are connected to the main control PCB.

7. The emergency power supply for a UFO highbay light according to claim 1, wherein the opening in the bottom of the first accommodating cavity is further connected to a second waterproof gasket.

8. The emergency power supply for a UFO highbay light according to claim 1, wherein a fixing table is disposed in a middle of the top of the power supply housing in a manner of extending upwards and is further provided with a first fixing hole, and the power supply cover plate is further provided with a wire hole.

* * * * *